United States Patent
Krenzer

[11] Patent Number: 5,873,683
[45] Date of Patent: Feb. 23, 1999

[54] BORING TOOL

[75] Inventor: Ulrich Krenzer, Zirndorf, Germany

[73] Assignee: Kennametal Hertel AG Werkzeuge + Hartstoffe, Fürth, Germany

[21] Appl. No.: 836,326

[22] PCT Filed: Nov. 10, 1995

[86] PCT No.: PCT/EP95/04425

§ 371 Date: May 9, 1997

§ 102(e) Date: May 9, 1997

[87] PCT Pub. No.: WO96/14954

PCT Pub. Date: May 23, 1996

[30] Foreign Application Priority Data

Nov. 10, 1994 [DE] Germany ............... 44 40 074.8

[51] Int. Cl.⁶ .................................................... B23B 51/00
[52] U.S. Cl. ........................ 408/230; 408/227; 408/713
[58] Field of Search ................................ 408/230, 227, 408/713

[56] References Cited

U.S. PATENT DOCUMENTS

| | | |
|---|---|---|
| 3,387,511 | 6/1968 | Ackart et al. ............. 408/230 |
| 4,679,971 | 7/1987 | Maier . |
| 4,721,422 | 1/1988 | Konwal ................. 408/713 |
| 4,961,672 | 10/1990 | Lindberg . |
| 5,160,232 | 11/1992 | Maier . |
| 5,211,516 | 5/1993 | Kress et al. ............ 408/713 |
| 5,312,209 | 5/1994 | Lindblom ............... 408/230 |
| 5,423,640 | 6/1995 | Lindblom et al. ........ 408/230 |

FOREIGN PATENT DOCUMENTS

| | | |
|---|---|---|
| 0549548 | 6/1993 | European Pat. Off. . |
| 5531535 | 3/1980 | Japan ..................... 408/230 |
| 597509 | 1/1984 | Japan ..................... 408/230 |
| 891250 | 12/1981 | U.S.S.R. ................. 408/230 |
| 2259263 | 3/1993 | United Kingdom . |

Primary Examiner—Steven C. Bishop
Assistant Examiner—Adesh Bhargava
Attorney, Agent, or Firm—Nils H. Ljungman and Associates

[57] ABSTRACT

A drilling tool, in particular a drill, has replaceable cutting elements that form the cutting edges, and chip-removing flutes. A chip shaping area (22) at least partially made of a more wear-resistant material than the drill body itself is arranged next to the faces (11) of the main cutting edges (5) approximately in the chip flow direction. In another embodiment, the chip shaping area if made of the same material as the drill body and is subjected to a subsequent local hardening process that makes it wear-resistant.

20 Claims, 5 Drawing Sheets

BORING TOOL

BACKGROUND OF THE INVENTION

1. Field of the Invention

This invention relates to a drilling tool, in particular a drill which has chip flutes for the removal of the chips, the drill cutting parts of which are formed by replaceable cutting elements. In the design of drills, one general problem is that the material of which the drill is made must on one hand be sufficiently hard and resistant to wear and abrasion, so that in the cutting area of the drill, the desired cutting action can be guaranteed over a long period. On the other hand, however, the drill must be sufficiently tough to withstand the torsional vibrations to which it is subjected during drilling. On drills of the prior art, this problem is solved by fabricating the drill using a material which is capable of withstanding the above-mentioned vibrations and has sufficient toughness, but which is therefore somewhat less resistant to wear, and the cutting parts are formed by replaceable cutting elements. Such replaceable cutting elements are also realized in the form of replaceable inserts. For the sake of simplicity, therefore, the term "replaceable inserts" will be used in the remainder of this description. In drills, the chip which has been removed from the workpiece, after the chip has been deflected by the face of the replaceable insert in the chip removal direction, is guided at a more or less acute angle toward the chip flute wall, where it is deformed into a spiral or a helical chip. The purpose of the deformation is to generate a chip spiral, the diameter of which is less than the depth of the chip space, i.e. the radial distance between the drill web and the wall of the drill-hole formed by the drill. A chip spiral shaped in this manner specifically comes into contact with the wall of the drill-hole only to an insignificant extent; it is transported away primarily with friction against the wall of the chip flute. The surface of the wall of the drill-hole is thereby protected.

2. Background Information

On account of the material of which the drill is made, which material has lower resistance to wear, however, the chip shaping area described above which is active in the deformation of the chip is subject to increased wear and abrasion. While the indexable inserts are designed to have a relatively long useful life, the above-mentioned wear causes uncontrolled changes in the chip shaping area, which can in particular be eroded in a concave fashion. The original chip shaping characteristics of the chip shaping area are thereby lost. One of several consequences of this situation is that the chip is deflected against the wall of the drill-hole, and as the chip is being removed, it rubs against the wall, as a result of which the surface quality of the wall of the drill-hole deteriorates. The wear of the chip shaping area can also result in the rupture of the chip. The chip fragments can become wedged in the chip space which is formed by the chip flute and the wall of the drill-hole, and can also have an adverse effect on the surface quality of the wall of the drill-hole. Chip fragments can even become jammed between the drill and the wall of the drill-hole, which results in a severe heating and finally a "welding" of the drill.

OBJECT OF THE INVENTION

The object of the invention is to create a drill which has greater resistance to abrasion than conventional drills, in particular drills which use replaceable inserts.

SUMMARY OF THE INVENTION

The invention teaches that this object can be accomplished by a chip shaping area which is located approximately in the chip removal direction laterally adjacent to the faces of the major cutting edge of the drill, and the chip shaping area is made at least partly of a wear-resistant material. The chip shaping area which is located laterally, in approximately the chip removal direction, adjacent to the rake faces of the inserts or the outer surfaces of the replaceable inserts is made at least partly of a material which has a greater wear resistance to abrasion than the drill body. Depending on the grade of the wear-resistant material used, the useful life of the drill can thereby be improved so that it is significantly longer than the useful life of the replaceable inserts. The shape and surface quality of the chip shaping area and thus its chip deformation characteristics remain practically unchanged throughout the useful life of the drill.

The chip shaping area, with its greater hardness than the material of the drill, can be formed by treating the chip shaping area, after the fabrication of the drill, with a locally limited hardening treatment. Various methods can be used for such a purpose. For example, the material from which the drill is made can be an alloy which can be thermally hardened. The chip shaping area can then be hardened by a laser beam, for example. It is also conceivable that the chip shaping area could be made wear-resistant by a subsequent coating with a wear-resistant material.

The chip shaping area is preferably formed by inserting into the chip flute a wear protection body which is made of an appropriate material. The wear protection body can thereby be designed so that its surface is flush with the surface of the adjacent wall of the chip flute, so that overall, the surface which is formed has a continuous curve. The wear protection body therefore does not project in a convex or raised manner from the wall of the chip flute, but is adjacent to the wall practically in the same plane and fits into the curvature of the wall of the chip flute practically without forming any step or discontinuity. It may be advantageous, however, if the wear protection body projects out of the wall of the chip flute, in which case it can then assume practically total responsibility for the shaping of the chip. This configuration simplifies the manufacture of the drill, because during the milling of the chip flute to a curvature which is suitable for the chip shaping, there is no need to take the wall of the chip flute into consideration. In particular, if an angle of less than 90 degrees is formed between the face of the replaceable inserts and the corresponding wall of the chip flute, additional time and effort, as well as the use of special milling cutters, are required to achieve such an angle. But if a wear protection body which has a concavely curved surface suitable for chip shaping as claimed by the invention is used in the chip shaping area of the chip flute, the curvature of the wall of the chip flute can be simplified. In particular, even angles larger than 90 degrees can be formed between the face of the replaceable insert and the corresponding chip wall, because the chip shaping is performed, independently of the curvature of the wall of the chip flute, solely by the concavely curved surface of the wear protection body which projects convexly or in a raised fashion out of the wall of the chip flute.

The curvature of the chip shaping area or of the wear protection body is selected so that the chip shaping radius which is active in the chip shaping process has a maximum value which equals one-quarter of the difference between the diameter and the core diameter of the drill. Such a chip shaping radius guarantees that the diameter of the chip spiral formed is less than the depth of the chip space, i.e. the radial distance between the drill web and the wall of the drill-hole.

The wear protection body is preferably made of a hard alloy such as carbide or a wear resistant to abrasion material, and is removably fastened in the chip flute. When the wear protection body becomes worn, it can either be replaced or recycled for use in other drills. It is also advantageous that, for working different materials, different wear protection bodies which are adapted to the respective chip shaping behavior of the materials can be used on one and the same drill. The wear protection body is advantageously installed by inserting it from the direction of the drill tip into a groove-like recess in the chip flute. Such a recess is relatively easy to create and guarantees a solid seating of the wear protection body. The solid seating is guaranteed in particular if the width of the groove decreases toward the drill shank, i.e. when the groove is realized so that it has a wedge shape, and the wear protection body is pressed into it so that it is form-fitted and friction-fitted in place. To fix the wear protection body in its position, it can be advantageous if locking screws are introduced into the body of the drill from the direction of the drill point.

The heads of these locking screws hold the wear protection body in its position. The wear bodies can be fixed in their position particularly reliably by means of a dovetail key seating of the wear protection body in the respective locator.

The surface of the wear protection body or of the chip shaping area is preferably provided with profile ribs which act as runners. The profile ribs are oriented parallel to one another, run in essentially the natural direction of chip removal and preferably extend over the entire width of the wear protection body. The curved path of the chips in the chip removal direction is promoted by the profile ribs. The profile ribs thereby act like runners which, depending on the strength of the workpiece material being processed, can also press into the chip to a certain extent, which enhances their performance in promoting and guiding the removal of the chips.

BRIEF DESCRIPTION OF THE DRAWINGS

The invention is explained in greater detail below with reference to the embodiments illustrated in the accompanying drawings.

DESCRIPTION OF THE PREFERRED EMBODIMENT

Figure 1:
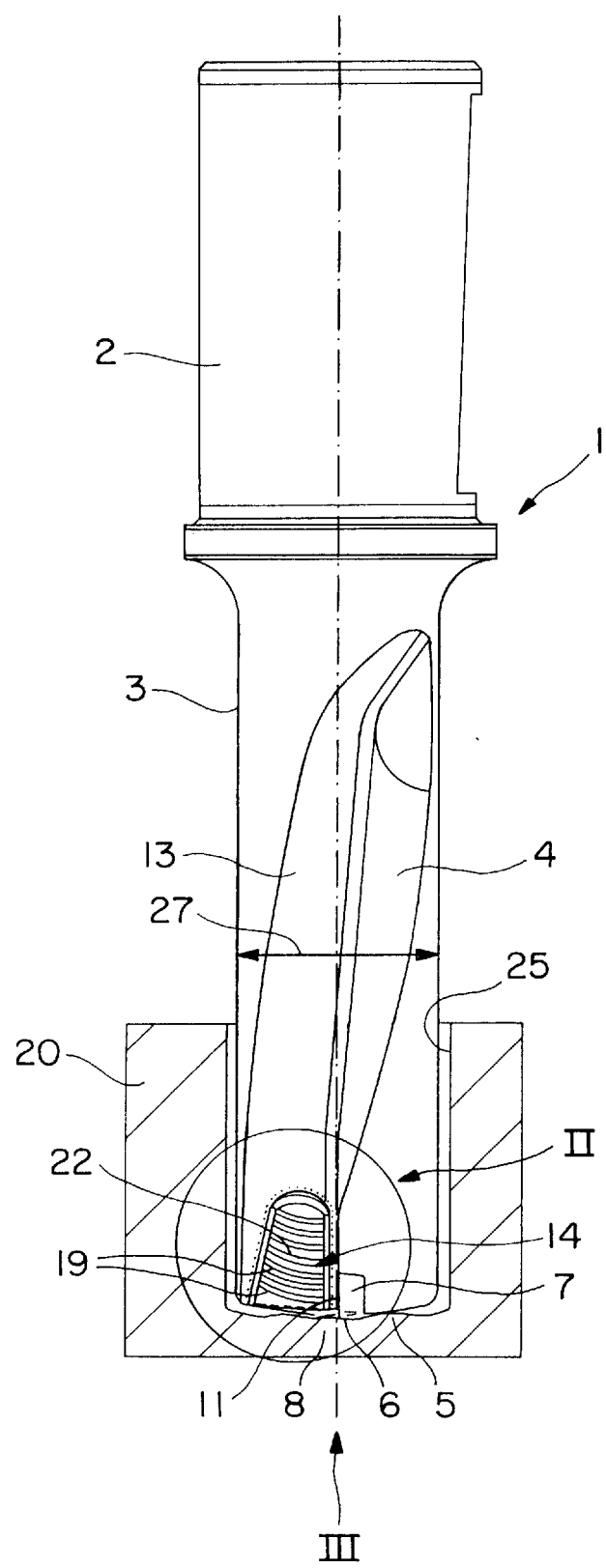
FIG. 1 shows a side view of a drill as claimed by the invention.

The drill illustrated in FIG. 1 and designated 1 in general has a drill which is divided into a shank 2 and a cutting part 3. In the cutting part 3, diametrically opposite one another, there are two chip flutes 4, which extend in a slightly inclined or spiral-shaped path over almost the entire length of the cutting part 3 and end at the end surface 5 of the drill. The drill major cutting edges 6 are preferably formed by replaceable inserts 7. The replaceable inserts 7 are inserted from the end surface 5 or the drill point 8 into a groove-like recess in the essentially cylindrical cutting part 3, where they are fastened in a suitable manner, in particular by means of a threaded connection. In the end surface, or more precisely in the flanks 9 (FIG. 3) of the major cutting edge 6, a coolant or lubricant channel 10 emerges, through which a coolant or lubricant can be supplied to the cutting area of the drill point. The chip faces 11, which have a rake, of the major cutting edges 6 essentially correspond to the outer surfaces of the replaceable inserts.

Figure 3:
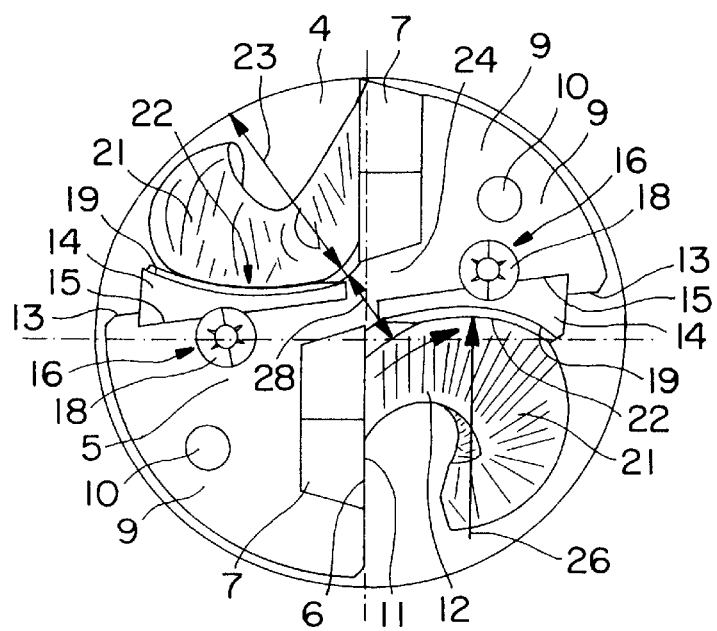
FIG. 3 shows a view in the direction of the Arrow III in FIG. 1.

Laterally adjacent to the rake faces 11, approximately in the direction of the chip removal, there is an area of the wall 13 of the chip flute which, when viewed in cross section or as illustrated in the overhead view in FIG. 3, has a concave curvature and is used for chip shaping. This chip shaping area 22 is formed by a wear protection body 14. The wear protection body is inserted so that it is form-fitted and friction-fitted in a locator groove 15 which is open toward the drill point. The form-fitting connection between the wear protection body 14 and the cutting part 3 is realized in the manner of a dovetail key. The width of the groove or the width of the wear protection body 14 decreases continuously from the drill point 8 to the shank 2. The locator groove 15 and the wear protection body 14 are therefore realized so that they have something of a wedge shape. The wear protection bodies 14 are secured by locking screws 16. The locking screws 16 are inserted from the point 8 into the flanks 9 in the direction of the drilling axis 17 of the drill 1, and hold the wear protection bodies 14 in position by means of their screw heads 18, or press them into the locator groove 15 which is tapered in the shape of a wedge.

The surface of the wear protection bodies 14 is concavely curved and is provided with rib-like projections, namely guide ribs 19. The wear protection bodies 14 are installed in the chip flute wall 13 so that they project convexly or in a raised fashion out of the surface of the wall 13. The guide ribs 19 extend approximately over the entire width of the wear protection bodies and are located at approximately equal intervals in the direction of the drilling axis 17 of the drill 1. The profile ribs 19 have a profile which is curved approximately in the shape of a banana, is initially oriented in the chip removal direction 12 approximately radially toward the drilling axis 17, and the ribs curve away from the drill point 8 as the distance from the corresponding major cutting edge 6 increases.

Figure 2:
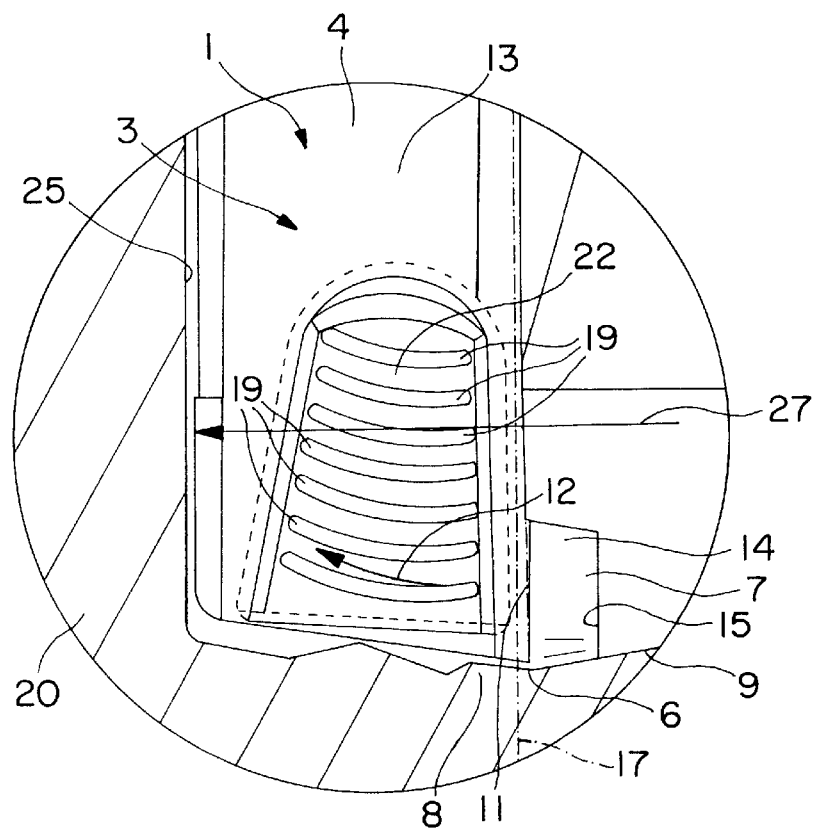
FIG. 2 shows a detail corresponding to line II in FIG. 1.

The drill claimed by the invention operates as follows: When drilling into the solid material of a workpiece 20 (FIGS. 1, 2), a chip 21 is removed by the major cutting edge 6 of the drill 1. The chip 21 is initially deflected by the chip face 11 or by the surface of the replaceable insert 7 approximately in the chip removal direction 12. The chip then encounters the chip shaping area 22 of the chip flute wall 13 which is adjacent to the chip face and is responsible for the chip shaping. The chip shaping region 22 on the drill claimed by the invention is not formed by the chip flute wall 13 itself, but by the wear protection body 14. The wear protection body 14, as indicated above, projects in a convex manner out of the chip flute wall and has a curvature which imparts a helical or spiral shape to the chip. The smallest radius of the chip shaping area 22 or of the concavely curved surface of the wear protection body 14, namely the chip shaping radius 26, is the primary and deciding factor in the chip shaping process. This radius must be selected so that the chip spiral formed has a diameter which is less than the depth 23 of the chip space. The depth 23 of the chip space is the radial distance between the drill core 24 and the wall 25 of the hole being drilled. To guarantee the appropriate shaping of the chip, the value of the chip shaping radius 26 must not be greater than one-quarter of the difference between the drill diameter 27 (FIG. 1) and the core diameter 28 (FIG. 3). On a drill as claimed by the invention, the chip 21 does not come in contact at all with the chip flute wall 13 in the area near the drill point. The chip flute wall 13 is thereby protected against wear caused by chips 21 which strike it. The wear protection body 14 itself is made of a hard alloy such as carbide or a wear resistant to abrasion material. The guide ribs 19 which are on its concavely curved surface which forms the chip shaping area promote the removal of the chip 21, because on one hand they reduce the contact area between the chip and the wear protection body 14, and on the other hand they acts as runners for the chip to slide over to direct and to promote the removal of the chip 21 in the chip removal direction.

Figures 4, 5:
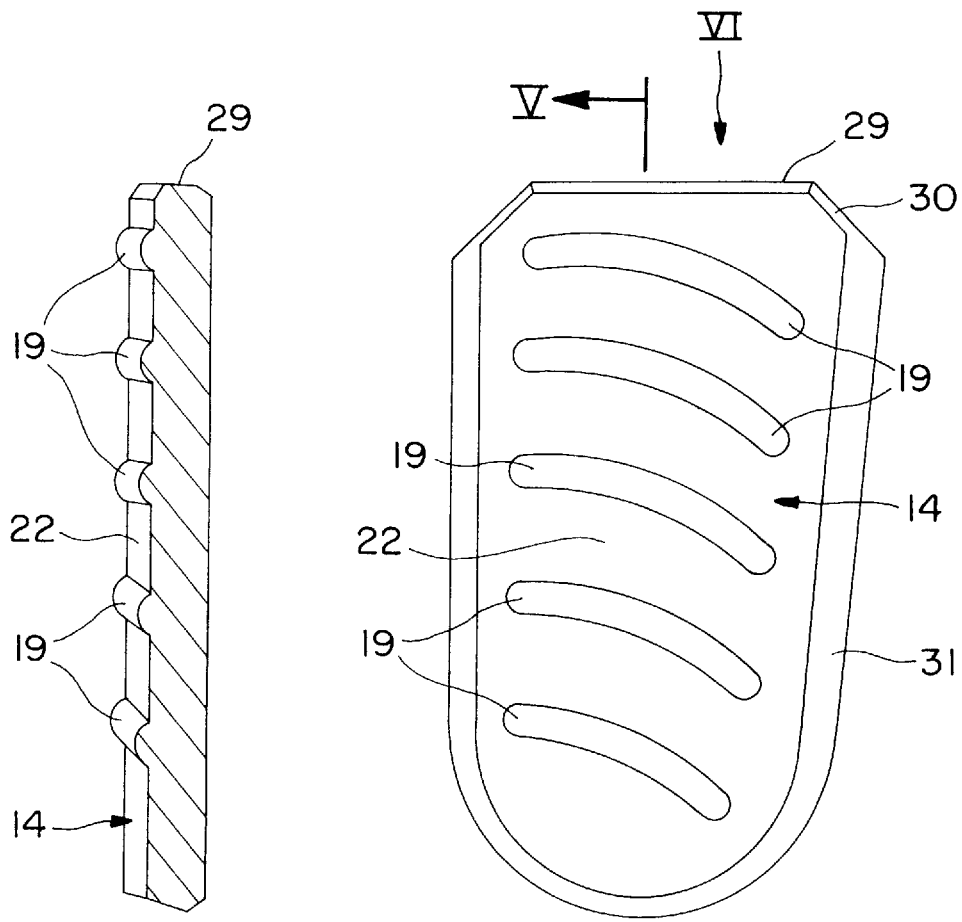
FIG. 4 shows an individual wear protection body.
FIG. 5 shows a cross section corresponding to Line V—V in FIG. 4.
Figure 6:
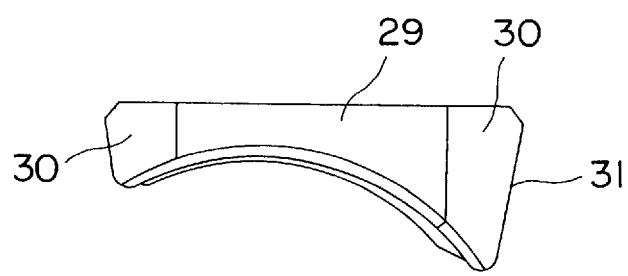
FIG. 6 shows a view in the direction indicated by the Arrow VI in FIG. 4.

The wear protection body 14, as shown schematically in FIG. 5, is a one-piece part. It can be appropriately manufactured using a sintering process. The end surface 29 of the wear protection body which, when installed, faces the tip 8 of the drilling tool is bevelled on both sides in the manner of a shoulder 30. FIG. 6 shows that the side surfaces 31 of the wear protection body 14 converge toward its concavely curved surface. Consequently, a dovetail-like key seating of the wear protection body 14 in the correspondingly configured locator groove 15 is guaranteed.

Figure 7:
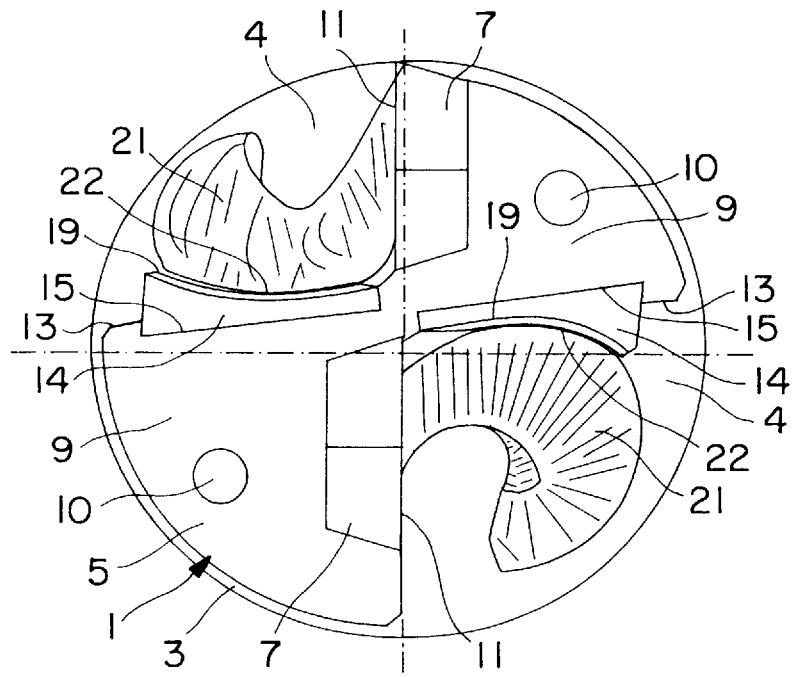
FIG. 7 shows a view as in FIG. 3 of a drill, in which the wear protection bodies are not secured by locking screws.

The embodiment illustrated in FIG. 7 differs from the embodiment described previously only in that there are no locking screws to fix the wear protection bodies 14 in position. In this case, the fastening can be accomplished, for example, by means of an adhesive process or soldering. This non-mechanical connection can be broken, for example, by the application of heat, or adhesive connections can be broken by the application of chemical solvents.

Figure 8:
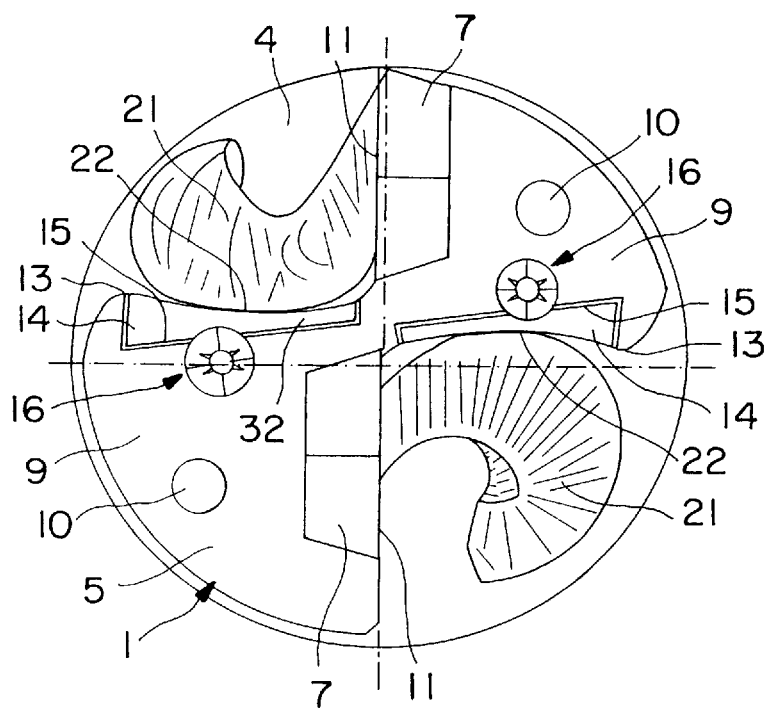
FIG. 8 shows an additional embodiment of a drill as claimed by the invention in a view like the one in FIG. 7.

In the embodiment illustrated in FIG. 8, the wear protection bodies 14 are completely recessed into the chip flute wall 13. The concavely curved surface of the wear protection body which forms the chip shaping area 22 does not project out of the chip flute wall 13, i.e. it is flush with the adjacent chip flute wall 15. This embodiment can be advantageous if the chip shaping area 22 does not need to be protected against wear over its entire width. It may be sufficient to provide protection in the form of a wear protection body 14 only for the area of the chip shaping area 22 which is exposed to the greatest wear, such as the area 32 which is close to the face 11.

Figure 9:
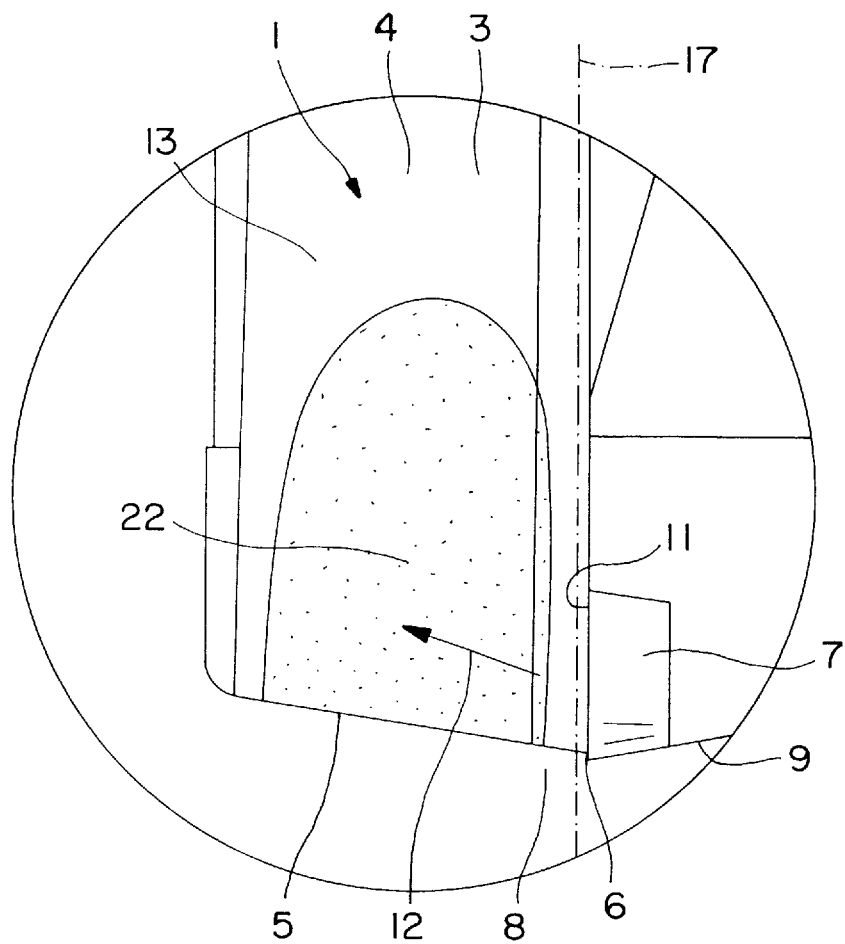
FIG. 9 shows an additional embodiment of a drill as claimed by the invention, in a view like the one in FIG. 2.

On the drill 1, details of which are illustrated in FIG. 9, the chip shaping area is protected against wear in an altogether different manner. In this case, a wear-resistant material is not inserted into the chip flute 4. Rather, the chip shaping area is made of the same material as the cutting part 3 and the shank 2 of the drill 1. In this case, the material of which the drill is made is subsequently hardened in an area which corresponds to the chip shaping area 22. Such a hardening can be accomplished by selecting a material which has the toughness desired for a drill of the type in question and which can be hardened by an additional treatment in the desired area. Such an additional treatment can be a thermal treatment, for example, which is designed to harden only the area which is responsible for the chip shaping, if necessary. It may also be appropriate to control the temperature by means of a laser beam. For the subsequent hardening, too, profile ribs 19 can be provided on the surface of the chip shaping area 22.

One feature of the invention resides broadly in the drilling tool, in particular with a drill which uses replaceable cutting inserts as the cutting parts, with a drill body and chip flutes machined into the drill body for the removal of the chips, characterized by the fact that the chip shaping area 22 which is located approximately in the chip removal direction 12 laterally adjacent to the faces 11 of the major cutting edge 6 of the drill, is made at least partly of a wear-resistant material.

Another feature of the invention resides broadly in the drilling tool characterized by the fact that the drill and chip shaping area 22 are made of the same material, and the chip shaping area 22 is formed by a subsequent and locally limited hardening or surface coating.

Yet another feature of the invention resides broadly in the drilling tool characterized by the fact that the chip shaping area 22 is formed by at least one wear protection body 14.

Still another feature of the invention resides broadly in the drilling tool characterized by the fact that the maximum value of the chip shaping radius 26 of the chip shaping area 22 which is active in the chip shaping process equals one-quarter of the difference between the diameter and the web diameter 28 of the drilling tool.

A further feature of the invention resides broadly in the drilling tool characterized by a detachable installation of the wear protection body or bodies 14.

Another feature of the invention resides broadly in the drilling tool characterized by the fact that the wear protection bodies 14 are made from a hard alloy such as carbide or from a wear resistant to abrasion material.

Yet another feature of the invention resides broadly in the drilling tool characterized by the fact that each wear protection body 14 is inserted in a groove-like recess 15 of the chip flute 4, which recess 15 is open toward the drill tip 8.

Still another feature of the invention resides broadly in the drilling tool characterized by a wedge-shaped configuration of the wear protection body 14, such that it is pressed from the direction of the drill tip 8 into a wedge-shaped groove to achieve a form-fitted and friction-fitted connection.

A further feature of the invention resides broadly in the drilling tool characterized by locking screws 16 which are introduced into the drill from the direction of the drill tip 8 and are used to fix the wear protection bodies 14 in position.

Another feature of the invention resides broadly in the drilling tool characterized by an essentially dovetail-shaped key seating of the wear protection body 14 in the portion of the drill body adjacent to the chip flute.

Yet another feature of the invention resides broadly in the drilling tool characterized by the fact that the surface of the chip shaping area 22 or of a wear protection body 14 contains guide ribs 19 which act as runners, are oriented approximately parallel to one another, and extend essentially in the chip removal direction 12.

Still another feature of the invention resides broadly in the drilling tool characterized by the fact that the guide ribs 19 extend over the entire width of the chip shaping area 22 or of the wear protection body 14.

A further feature of the invention resides broadly in the drilling tool characterized by guide ribs 19 which are curved approximately in the shape of a banana, are initially oriented in the chip removal direction 12 approximately radially toward the drilling axis 17, and as the distance from the corresponding major cutting edge 6 increases, curve away from the drilling tip 8.

The invention as described hereinabove in the context of the preferred embodiments is not to be taken as limited to all of the provided details thereof, since modifications and variations thereof may be made without departing from the spirit and scope of the invention.

Nomenclature

1 Drill
2 Shank
3 Cutting part
4 Chip flute
5 End surface
6 Major cutting edge
7 Replaceable insert
8 Drill tip
9 Flank
10 Lubricant/cooling channel
11 Face
12 Chip removal direction
13 Chip flute wall
14 Wear protection body
15 Locator groove
16 Locking screw
17 Drill axis
18 Screw head
19 Projection
20 Workpiece
21 Chip
22 Chip shaping area
23 Chip space depth
24 Drill core
25 Drill-hole wall
26 Chip shaping radius
27 Drill diameter
28 Core diameter
29 End surface
30 Shoulder
31 Side surface
32 Area

What is claimed is:

1. A drill comprising:

a drill body;

said drill body having an axis of rotation;

a cutting region;

said cutting region being configured to cut chips from a workpiece and direct chips in a chip removal direction;

said cutting region comprising a cutting edge to cut chips from a workpiece;

a chip flute configured to direct chips away from said cutting region;

said cutting region comprising a surface;

said surface of said cutting region being disposed immediately adjacent to said cutting edge;

said surface of said cutting region extending along said chip flute;

an abrasion resistant region being disposed adjacent to said cutting region in substantially the chip removal direction;

said abrasion resistant region being resistant to abrasion from chips produced by said cutting region;

at least a portion of said abrasion resistant region comprising a chip shaping region to direct and shape chips as chips are directed away from said cutting region;

said abrasion resistant region being disposed adjacent to said surface of said cutting region;

a portion of said drill being disposed immediately adjacent to said abrasion resistant region; and said abrasion resistant region being substantially more resistant to abrasion than said portion immediately adjacent to said abrasion resistant region.

2. The drill according to claim 1, wherein:

said chip flute has a length extending substantially along the axis of rotation and a width disposed substantially transverse to the axis of rotation; and said abrasion resistant region is disposed adjacent to said surface of said cutting region in a direction substantially along the width of said chip flute.

3. The drill according to claim 2, wherein:

said portion disposed immediately adjacent to said abrasion resistant region comprises the same material as said abrasion resistant region; and said abrasion resistant region comprises one of:
a surface coating on said chip flute; and
a hardened portion of said chip flute.

4. The drill according to claim 2, wherein said abrasion resistant region comprises a distinct wear protection body connected to said chip flute.

5. The drill according to claim 4, wherein said drill comprises:

a drill diameter;

said chip flute comprises at least two chip flutes;

a drill web disposed between said at least two chip flutes;

said drill web has a width extending between said at least two chip flutes;

said chip shaping region comprises a portion to shape chips;

said portion of said chip shaping region to shape chips has a maximum radius of curvature; and the maximum radius of curvature of said portion of said chip shaping region to shape ships is not greater than one-quarter of the difference between the drill diameter and the drill web width.

6. The drill according to claim 5, wherein said wear protection body is detachably connected to one of said chip flutes.

7. The drill according to claim 6, wherein said wear protection body comprises one of:

a hard alloy; and carbide.

8. The drill according to claim 7, wherein said drill comprises:

a drill tip;

said cutting edge is disposed at said drill tip;

said one of said chip flutes comprises a recess;

said recess is open towards said drill tip;

said wear protection body is inserted in said recess;

said recess is configured as a wedge-shaped groove;

said wear protection body is configured as a wedge-shaped body; and said wear protection body and said recess form a frictional connection therebetween upon said wear protection body being pressed into said recess from a direction of said drill tip.

9. The drill according to claim 8, wherein said drill comprises:

an arrangement to hold said wear protection body in a connected position with said one of said chip flutes; and said-arrangement to hold said wear protection body comprises at least one locking screw configured to be introduced from the direction of said drill tip.

10. The drill according to claim 9, wherein said recess and said wear protection body form a dovetail-shaped connection therebetween.

11. The drill according to claim 10, wherein:
said chip shaping region comprises a surface to contact the chips produced by said cutting edge;
said chip shaping region comprises a plurality of guide ribs projecting from said surface of said chip shaping region;
said plurality of guide ribs is disposed to direct chips produced by said cutting edge;
each of said plurality of guide ribs is disposed substantially parallel to one another; and
said plurality of guide ribs are disposed to extend substantially in the chip removal direction.

12. The drill according to claim 11, wherein:
said chip shaping region has a width extending in substantially the chip removal direction; and
said plurality of guide ribs extend over substantially the entire width of said chip shaping region.

13. The drill according to claims 12, wherein:
each of said plurality of guide ribs is curved in substantially a shape of a banana;
each of said plurality of guide ribs extends from a position nearer said cutting region to a position further away from said cutting region;
a portion of each of said plurality of guide ribs disposed in the position nearer said cutting region extends substantially radially with respect to the axis of rotation; and
a portion of each of said plurality of guide ribs disposed in the position further away from said cutting region curves away from said drill tip as each of said plurality of guide ribs extend further away from said cutting region.

14. The drill according to claim 2, wherein:
said cutting region comprises a replaceable cutting insert; and
said replaceable cutting insert comprises said cutting edge and said surface disposed immediately adjacent said cutting edge.

15. The drill according to claim 14, wherein:
said portion disposed immediately adjacent to said abrasion resistant region comprises the same material as said abrasion resistant region; and
said abrasion resistant region comprises one of:
a surface coating on said chip flute; and
a hardened portion of said chip flute.

16. The drill according to claims 14, wherein said abrasion resistant region comprises a distinct wear protection body connected to said chip flute.

17. The drill according to claim 16, wherein said drill comprises:
a drill diameter;
said chip flute comprises at least two chip flutes;
a drill web disposed between said at least two chip flutes;
said drill web has a width extending between said at least two chip flutes;
said chip shaping region comprises a portion to shape chips;
said portion of said chip shaping region to shape chips has a maximum radius of curvature;
the maximum radius of curvature of said portion of said chip shaping region to shape chips is not greater than one-quarter of the difference between the drill diameter and the drill web width;
a drill tip;
said cutting edge is disposed at said drill tip;
said wear protection body is detachably connected to one of said chip flutes;
said wear protection body comprises one of:
a hard alloy; and
carbide;
said one of said chip flutes comprises a recess;
said recess is open towards said drill tip;
said wear protection body is inserted in said recess;
said recess is configured as a wedge-shaped groove;
said wear protection body is configured as a wedge-shaped body;
said wear protection body and said recess form a frictional connection therebetween upon said wear protection body being pressed into said recess from a direction of said drill tip;
said drill body comprises an arrangement to hold said wear protection body in a connected position with said one of said chip flutes;
said arrangement to hold said wear protection body comprises at least one locking screw configured to be introduced from the direction of said drill tip;
said recess and said wear protection body form a dovetail-shaped connection therebetween;
said chip shaping region comprises a surface to contact the chips produced by said cutting edge;
said chip shaping region comprises a plurality of guide ribs projecting from said surface of said chip shaping region;
said plurality of guide ribs is disposed to direct chips produced by said cutting edge;
each of said plurality of guide ribs is disposed substantially parallel to one another;
said plurality of guide ribs are disposed to extend substantially in the chip removal direction;
said chip shaping region has a width extending in substantially the chip removal direction;
said plurality of guide ribs extend over substantially the entire width of said chip shaping area;
each of said plurality of guide ribs is curved in substantially a shape of a banana;
each of said plurality of guide ribs extends from a position nearer said cutting region to a position further away from said cutting region;
a portion of each of said plurality of guide ribs disposed in the position nearer said cutting region extends substantially radially with respect to the axis of rotation; and
a portion of each of said plurality of guide ribs disposed in the position further away from said cutting region curves away from said drill tip as each of said plurality of guide ribs extend further away from said cutting region.

18. A drilling tool comprising:
a cutting region;
said cutting region to cut chips from a workpiece and direct chips in a chip removal direction;
an abrasion resistant region being disposed adjacent to said cutting region;

said abrasion resistant region being resistant to abrasion from chips produced by said cutting region;

at least a portion of said abrasion resistant region comprising a chip shaping region to shape chips produced by said cutting edge;

at least a portion of said abrasion resistant region being disposed in substantially the chip removal direction;

a portion of said drill being disposed immediately adjacent to said abrasion resistant region; and said abrasion resistant region being substantially more resistant to abrasion than said portion disposed immediately adjacent to said abrasion resistant region.

19. The drilling tool according to claim 18, wherein said drilling tool comprises:

a drill body;

said drill body has an axis of rotation;

said drill body has a length extending substantially along the axis of rotation and a width disposed substantially transverse to the axis of rotation; and said abrasion resistant region is disposed adjacent to said surface of said cutting region in a direction substantially along the width of said drill body.

20. A drilling tool comprising:

a drill body;

said drill body having an axis of rotation;

a cutting region to cut chips from a workpiece and direct chips in a chip removal direction;

said cutting region comprising a cutting edge to cut chips from a workpiece;

a chip flute to direct chips away from said cutting region;

said cutting region comprising a surface;

said surface of said cutting region being disposed adjacent to said cutting edge;

said surface of said cutting region extending along said chip flute;

a replaceable abrasion resistant insert being disposed adjacent to said cutting region in substantially the chip removal direction;

said replaceable abrasion resistant insert being resistant to abrasion from chips produced by said cutting region;

said replaceable abrasion resistant insert being disposed adjacent to said surface of said cutting region;

a portion of said drill being disposed adjacent to said replaceable abrasion resistant insert; and said replaceable abrasion resistant insert being substantially more resistant to abrasion than said portion of said drill adjacent to said replaceable abrasion resistant insert.

* * * * *